US011347975B2

(12) United States Patent
Krishnan et al.

(10) Patent No.: US 11,347,975 B2
(45) Date of Patent: May 31, 2022

(54) SUPERVISED CONTRASTIVE LEARNING WITH MULTIPLE POSITIVE EXAMPLES

(71) Applicant: Google LLC, Mountain View, CA (US)

(72) Inventors: Dilip Krishnan, Arlington, MA (US); Prannay Khosla, Cambridge, MA (US); Piotr Teterwak, Boston, MA (US); Aaron Yehuda Sarna, Cambridge, MA (US); Aaron Joseph Maschinot, Somerville, MA (US); Ce Liu, Cambridge, MA (US); Phillip John Isola, Cambridge, MA (US); Yonglong Tian, Cambridge, MA (US); Chen Wang, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/235,992

(22) Filed: Apr. 21, 2021

(65) Prior Publication Data
US 2021/0326660 A1    Oct. 21, 2021

Related U.S. Application Data

(63) Continuation of application No. PCT/US2021/026836, filed on Apr. 12, 2021.
(Continued)

(51) Int. Cl.
*G06K 9/62* (2022.01)
*G06N 3/08* (2006.01)
*G06V 10/82* (2022.01)

(52) U.S. Cl.
CPC .......... *G06K 9/6263* (2013.01); *G06K 9/628* (2013.01); *G06K 9/6215* (2013.01); *G06K 9/6256* (2013.01); *G06N 3/08* (2013.01)

(58) Field of Classification Search
CPC .... G06K 9/6263; G06K 9/628; G06K 9/6215; G06K 9/6256; G06N 3/08
See application file for complete search history.

(56) References Cited

U.S. PATENT DOCUMENTS 10,592,732 B1 *  3/2020  Sather ................. G06N 3/0472
10,832,062 B1 * 11/2020  Evans ................. G05D 1/0246
(Continued)

OTHER PUBLICATIONS

Baum et al., "Supervised Learning of Probability Distributions by Neural Networks", Advances in Neural Information Processing Systems, 1988, Denver, Colorado, pp. 52-61.
(Continued)

*Primary Examiner* — John W Lee
(74) *Attorney, Agent, or Firm* — Dority & Manning, P.A.

(57) ABSTRACT

The present disclosure provides an improved training methodology that enables supervised contrastive learning to be simultaneously performed across multiple positive and negative training examples. In particular, example aspects of the present disclosure are directed to an improved, supervised version of the batch contrastive loss, which has been shown to be very effective at learning powerful representations in the self-supervised setting. Thus, the proposed techniques adapt contrastive learning to the fully supervised setting and also enable learning to occur simultaneously across multiple positive examples.

18 Claims, 7 Drawing Sheets

Related U.S. Application Data

(60) Provisional application No. 63/013,153, filed on Apr. 21, 2020.

(56) References Cited

U.S. PATENT DOCUMENTS

| | | | |
|---|---|---|---|
| 10,922,574 B1* | 2/2021 | Tariq | G06V 20/56 |
| 2017/0124711 A1 | 5/2017 | Chandraker et al. | |
| 2018/0137642 A1* | 5/2018 | Malisiewicz | G06N 3/0445 |
| 2020/0090039 A1* | 3/2020 | Song | G06V 10/255 |

OTHER PUBLICATIONS

Cao et al., "Learning Imbalanced Datasets with Label-Distribution-Aware Margin Loss", arXiv:1906.07413v2, Oct. 27, 2019, 18 pages.
Chen et al., "A Simple Framework for Contrastive Learning of Visual Representations", arXiv:2002.05709v3, Jul. 1, 2020, 20 pages.
Chopra et al., "Learning a Similarity Metric Discriminatively, with Application to Face Verification", 2005 IEEE Computer Society Conference on Computer Vision and Pattern Recognition (CVPR), Jun. 20-26, 2006, San Diego, CA, 8 pages.
Cubuk et al., "AutoAugment: Learning Augmentation Strategies from Data", IEEE Conference on Computer Vision and Pattern Recognition, Jun. 16-20, 2019, Long Beach, CA.
Cubuk et al., "RandAugment: Practical automated data augmentation with a reduced search space", arXiv:1909.13719v2, Nov. 14, 2019, 13 pages.
Deng et al., "ImageNet: A Large-Scale Hierarchical Image Database", 2009 IEEE Conference on Computer Vision and Pattern Recognition, Jun. 20-25, 2009, Miami, FL, 8 pages.
Devlin et al., "BERT: Pre-training of Deep Bidirectional Transformers for Language Understanding", arXiv:1810.04805v1, Oct. 11, 2018, 14 pages.
Doersch et al., "Unsupervised Visual Representation Learning by Context Prediction", IEEE International Conference on Computer Vision, Dec. 11-18, 2015, Santiago, Chile, pp. 1422-1430.
Elsayed et al., "Large Margin Deep Networks for Classification", Thirty-second Conference on Neural Information Processing Systems, Dec. 3-8, 2018, Montreal, Canada, 11 pages.
Frosst et al., "Analyzing and Improving Representations with the Soft Nearest Neighbor Loss", 36$^{th}$ International Conference on Machine Learning, Jun. 9-15, 2019, Long Beach, CA, 9 pages.
Gutmann et al., "Noise-contrastive estimation: A new estimation for unnormalized statistical models", Thirteenth International Conference on Artificial Intelligence and Statistics, May 13-15, 2010, Sardinia, Italy, 8 pages.
He et al., "Deep Residual Learning for Image Recognition", IEEE Conference on Computer Vision and Pattern Recognition, Jun. 26-Jul. 1, 2016, Las Vegas, Nevada, pp. 770-778.
He et al., "Momentum Contrast for Unsupervised Visual Representation Learning", arXiv:1911.05722v2, Nov. 14, 2019, 11 pages.
He et al., "Rethinking ImageNet Pre-training", IEEE International Conference on Computer Vision, Oct. 27-Nov. 2, 2019, Seoul, Korea, pp. 4918-4927.
Henaff et al., "Data-Efficient Image Recognition with Contrastive Predictive Coding", arXiv:1905.09272v2, Dec. 6, 2019, 15 pages.
Hendrycks et al., "Benchmarking Neural Network Robustness To Common Corruptions and Perturbations", arXiv:1903.12261v1, Mar. 28, 2019, 16 pages.
Hinton et al., "Distilling the Knowledge in a Neural Network", arXiv:1503.02531v1, Mar. 9, 2015, 9 pages.
Hinton et al., "Neural Networks for Machine Learning Lecture 6a Overview of mini-batch gradient descent", University of Toronto Department of Computer Science, Lecture Slides, 2012, 31 pages.
Hjelm et al., "Learning Deep Representations by Mutual Information Estimation and Maximization", Seventh International Conference on Learning Representations, May 6-9, 2019, New Orleans, Louisiana, 24 pages.
Kamnitsas et al., "Semi-Supervised Learning via Compact Latent Space Clustering", arXiv:1806.02679v2, Jul. 29, 2018, 10 pages.
Kolesnikov et al., "Large Scale Learning of General Visual Representations for Transfer", arXiv:1912.11370v1, Dec. 24, 2019, 23 pages.
Kornblith et al., "Do Better ImageNet Models Transfer Better?", IEEE Conference on Computer Vision and Partern Recognition, Jun. 16-20, 2019, Long Beach, CA, pp. 2661-2671.
Krizhevsky et al., "ImageNet Classification with Deep Convolutional Neural Networks", Twenty-sixth Conference on Neural Information Processing Systems, Dec. 3-8, 2012, Lake Tahoe, Nevada, 9 pages.
Krizhevsky et al., "Learning Multiple Layers of Features from Tiny Images", University of Toronto, Technical Report, 2009, 60 pages.
Lim et al., "Fast AutoAugment", arXiv:1905.00397v2, May 25, 2019, 10 pages.
Liu et al., "Lage-Margin Softmax Loss for Convolutional Neural Networks", 33$^{rd}$ International Conference on Machine Learning, Jun. 19-24, 2016, New York City, NY, 10 pages.
Mikolov et al., "Distributed Representations of Words and Phrases and their Compositionality", Twenty-seventh Conference on Neural Information Processing Systems, Dec. 5-10, 2013, Lake Tahoe, Nevada, 9 pages.
Mnih et al., "Learning word embeddings efficiently with noise-contrastive estimation", Twenty-seventh Conference on Neural Information Processing Systems, Dec. 5-10, 2013, Lake Tahoe, Nevada, 9 pages.
Muller et al., "When Does Label Smoothing Help?", Thirty-third Conference on Neural Information Processing Systems, Dec. 8-14, 2019, Vancouver, Canada, 10 pages.
Nar et al., "Cross-Entropy Loss and Low-Rank Features Have Responsibility for Adversarial Examples", arXiv:1901.08360vl, Jan. 24, 2019, 10 pages.
Noroozi et al., "Unsupervised Learning of Visual Representations by Solving Jigsaw Puzzles", arXiv:1603.09246v2, Jun. 26, 2016, 17 pages.
Oord et al., "Representation Learning with Contrastive Predictive Coding", arXiv:1807.03748v1, Jul. 10, 2018, 13 pages.
Ruder, "An overview of gradient descent optimization algorithms", arXiv:1609.04747v1, Sep. 15, 2016, 12 pages.
Rumelhart et al., "Learning representations by back-propagating errors", Nature, vol. 323, Oct. 9, 1986, pp. 533-536.
Salakhutdinov et al., "Learning a Nonlinear Embedding by Preserving Class Neighbourhood Structure", Proceedings of Machine Learning Research (PMLR), vol. 2, 2017, 8 pages.
Schroff et al., "FaceNet: A Unified Embedding for Face Recognition and Clustering", IEEE Conference on Computer Vision and Pattern Recognition, Jun. 7-12, 2015, Boston, Massachusetts, 9 pages.
Sermanet et al., "Time-Contrastive Networks: Self-Supervised Learning from Video", arXiv:1704.06888v3, Mar. 20, 2018, 15 pages.
Simonyan et al., "Very Deep Convolutional Networks For Large-Scale Image Recognition", arXiv:1409.1556v6, Apr. 10, 2015, 14 pages.
Sohn, "Improved Deep Metric Learning with Multi-class N-pair Loss Objective", Thirtieth Conference on Neural Information Processing Systems, Dec. 5-10, 2016, Barcelona, Spain, 9 pages.
Solla et al., "Accelerated Learning in Layered Neural Networks", Complex Systems, vol. 2, 1988, pp. 625-640.
Sukhbaatar et al., "Training Convolutional Networks With Noisy Labels", arXiv:1406.2080v2, Dec. 20, 2014, 11 pages.
Szegedy et al., "Rethinking the Inception Architecture for Computer Vision", IEEE Conference on Computer Vision and Pattern Recognition, Jun. 26-Jul. 1, 2016, Las Vegas, Nevada, pp. 2818-2826.
Tian et al., "Contrastive Multiview Coding", arXiv:1906.05849v3, Oct. 21, 2019, 21 pages.
Tian et al., "What Makes for Good Views for Contrastive Learning", arXiv:2005.10243v3, Dec. 18, 2020, 24 pages.
Tschannen et al., "On Mutual Information Maximization for Representation Learning", arXiv:1907.13625v2, Jan. 23, 2020, 16 pages.
Wang et al., "Understanding Contrastive Representation Learning through Alignment and Uniformity on the Hypersphere", arXiv:2005.10242v9, Nov. 10, 2020, 41 pages.

(56) References Cited

OTHER PUBLICATIONS

Weinberger et al., "Distance Metric Learning for Large Margin Nearest Neighbor Classification", Journal of Machine Learning Research, vol. 10, Feb. 2009, pp. 207-244.

Wu et al., "Improving Generalization via Scalable Neighborhood Component Analysis", European Conference on Computer Vision (ECCV), Sep. 8-14, 2018, Munich, Germany, 17 pages.

Wu et al., "Unsupervised Feature Learning via Non-Parametric Instance Discrimination", IEEE Conference on Computer Vision and Pattern Recognition (CVPR), Jun. 18-22, 2018, Salt Lake City, Utah, 10 pages.

Xie et al., "Self-training with Noisy Student improves ImageNet classification", arXiv:1911.04252v1, Nov. 11, 2019, 13 pages.

Yang et al., "Deep Representation Learning with Target Coding", Twenty-ninth AAAI Conference on Artificial Intelligence (AAAI-15), Jan. 25-30, 2015, Austin, Texas, 7 pages.

You et al., "Large Batch Training of Convolutional Networks", arXiv:1708.03888v3, Sep. 13, 2017, 8 pages.

Yun et al., "CutMix: Regularization Strategy to Train Strong Classifiers with Localizable Features", IEEE International Conference on Computer Vision, Oct. 27-Nov. 2, 2019, Seoul, Korea, pp. 6023-6032.

Zhang et al., "Colorful Image Colorization", European Conference on Computer Vision, European Conference on Computer Vision (ECCV), Oct. 8-16, 2016, Amsterdam, The Netherlands, pp. 649-666.

Zhang et al., "Generalized Cross Entropy Loss for Training Deep Neural Networks with Noisy Labels", Thirty-second Conference on Neural Information Processing Systems, Dec. 2-8, 2018, Montreal, Canada, 11 pages.

Zhang et al., "mixup: Beyond Empirical Risk Minimization", arXiv:1710.09412v1, Oct. 25, 2017, 11 pages.

Zhang et al., "Split-Brain Autoencoders: Unsupervised Learning by Cross-Channel Prediction", IEEE Conference on Computer Vision and Pattern Recognition, Jul. 21-26, 2017, Honolulu, Hawaii, pp. 1058-1067.

Zhilin et al., "XLNet: Generalized Autoregressive Pretraining for Language Understanding", Thirty-third Conference on Neural Information Processing Systems, Dec. 8-14, 2019, Vancouver, Canada, 11 pages.

Chen et al., "A Simple Framework for Contrastive Learning of Visual Representations", arXiv:2002.05709v2, 18 pages.

International Search Report and Written Opinion for Application No. PCT/US2021/026836, dated Aug. 16, 2021, 19 pages.

Khosla et al., "Supervised Contrastive Learning", arXiv:2004.11362v5, 24 pages.

Zhu et al., "A New Loss Function for CNN Classifier Based on Predefined Evenly-Distributed Class Centroids," IEEE Access, vol. 8, 2019, pp. 10889-10895.

\* cited by examiner

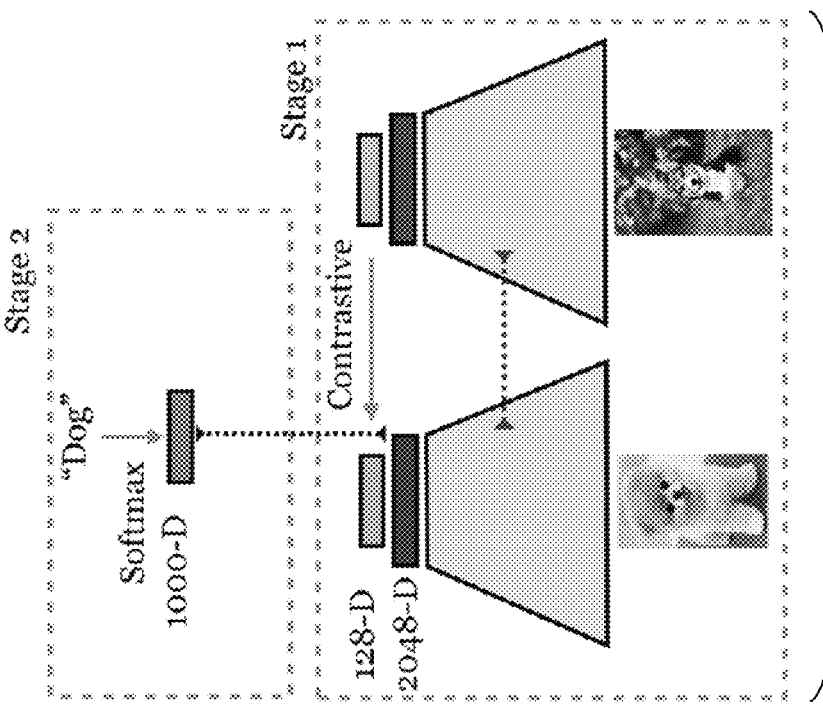
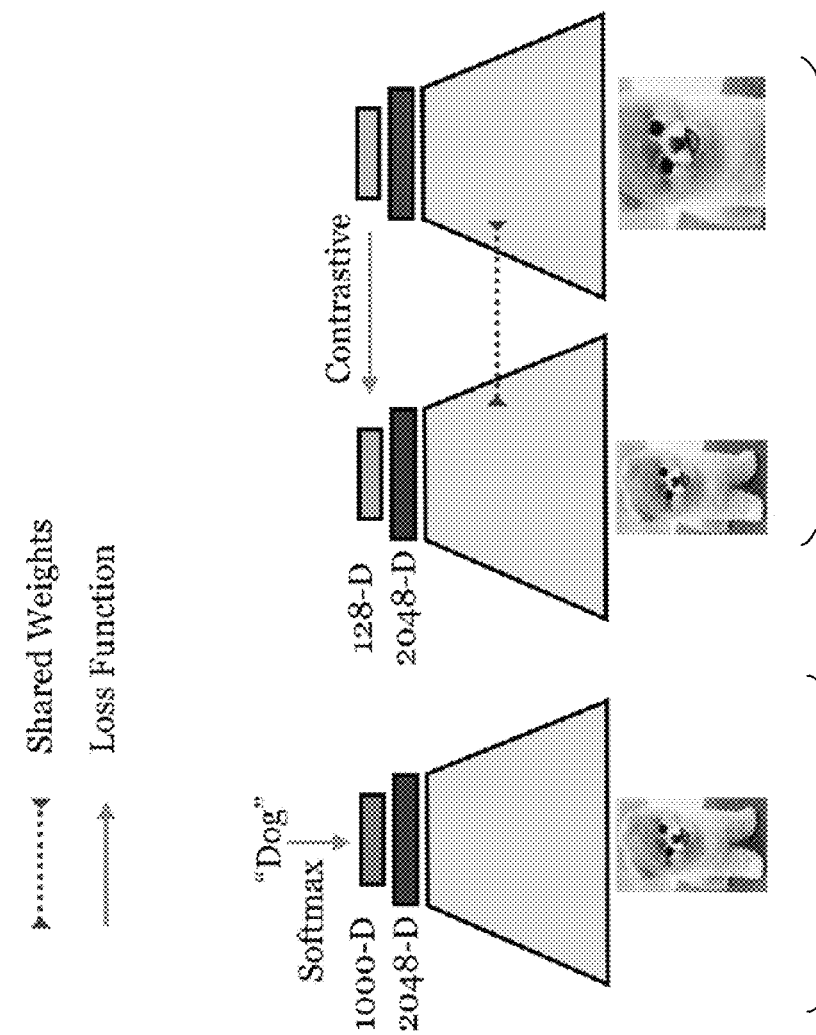
Figure 2A  Figure 2B  Figure 2C

SUPERVISED CONTRASTIVE LEARNING WITH MULTIPLE POSITIVE EXAMPLES

RELATED APPLICATIONS

This application claims priority to and the benefit of each of U.S. Provisional Patent Application No. 63/013,153, filed Apr. 21, 2020, and PCT Application Number PCT/US21/26836, filed Apr. 12, 2021. Each of U.S. Provisional Patent Application No. 63/013,153 and PCT Application Number PCT/US21/26836 is hereby incorporated by reference in its entirety.

FIELD

The present disclosure relates generally to systems and methods for contrastive learning of visual representations. More particularly, the present disclosure relates to systems and methods to perform supervised contrastive learning across multiple positive examples.

BACKGROUND

The cross-entropy loss is likely the most widely used loss function for supervised learning. It is naturally defined as the KL-divergence between two discrete distributions: the empirical label distribution (a discrete distribution of 1-hot vectors) and the empirical distribution of the logits.

A number of works have explored shortcomings with this loss, such as lack of robustness to noisy labels and the possibility of poor margins, which lead to reduced generalization performance. In practice, however, most proposed alternatives do not seem to have worked better for large-scale datasets, such as ImageNet, as evidenced by the continued use of cross-entropy to achieve state of the art results.

Many proposed improvements to regular cross-entropy in fact involve a loosening of the definition of the loss, specifically that the reference distribution is axis-aligned. Models trained with these modifications show improved generalization, robustness, and calibration. However, the proposed improvements are unable to completely eliminate the drawbacks of the cross-entropy loss approach.

SUMMARY

Aspects and advantages of embodiments of the present disclosure will be set forth in part in the following description, or can be learned from the description, or can be learned through practice of the embodiments.

One example aspect of the present disclosure is directed to a computing system to perform supervised contrastive learning of visual representations. The computing system includes one or more processors and one or more non-transitory computer-readable media that collectively store: a base encoder neural network configured to process an input image to generate an embedding representation of the input image; a projection head neural network configured to process the embedding representation of the input image to generate a projected representation of the input image; and instructions that, when executed by the one or more processors, cause the computing system to perform operations. The operations include obtaining an anchor image associated with a first class of a plurality of classes, a plurality of positive images associated with the first class, and one or more negative images associated with one or more other classes of the plurality of classes, the one or more other classes being different from the first class. The operations include processing, with the base encoder neural network, the anchor image to obtain an anchor embedding representation for the anchor image, the plurality of positive images to respectively obtain a plurality of positive embedding representations, and the one or more negative images to respectively obtain one or more negative embedding representations. The operations include processing, with the projection head neural network, the anchor embedding representation to obtain an anchor projected representation for the anchor image, the plurality of positive embedding representations to respectively obtain a plurality of positive projected representations, and the one or more negative embedding representations to respectively obtain one or more negative projected representations. The operations include evaluating a loss function that evaluates a similarity metric between the anchor projected representation and each of the plurality of positive projected representations and each of the one or more negative projected representations. The operations include modifying one or more values of one or more parameters of at least the base encoder neural network based at least in part on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-C illustrate differences between cross entropy, self-supervised contrastive loss, and supervised contrastive loss according to example embodiments of the present disclosure.

Figures 1A, 1B:
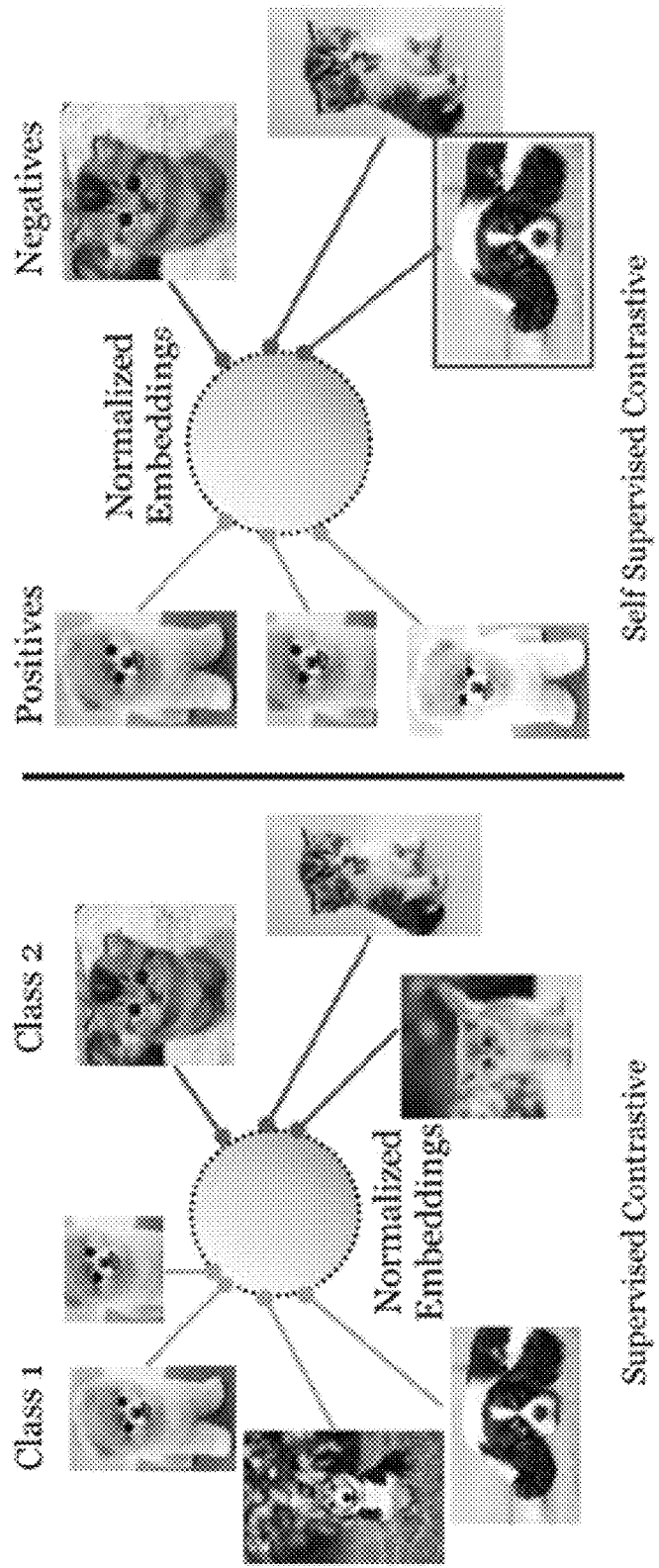
FIGS. 1A and 1B illustrate differences between supervised vs. self-supervised contrastive losses according to example embodiments of the present disclosure.

Reference numerals that are repeated across plural figures are intended to identify the same features in various implementations.

DETAILED DESCRIPTION

Overview

Generally, the present disclosure is directed to an improved training methodology that enables supervised contrastive learning to be simultaneously performed across multiple positive and negative training examples. In particular, example aspects of the present disclosure are directed to an improved, supervised version of the batch contrastive loss, which has been shown to be very effective at learning powerful representations in the self-supervised setting. Thus, the proposed techniques adapt contrastive learning to the fully supervised setting and also enable learning to occur simultaneously across multiple positive examples.

By enabling contrastive learning to occur simultaneously across both multiple positive training examples from the same class and multiple negative training examples from other classes, whole clusters of points belonging to the same class can be pulled together in embedding space, while clusters of samples from different classes are simultaneously pushed apart. Thus, the proposed techniques operate to increase the similarity between positive pairs of samples and decrease similarity between negative pairs. Similarity can be defined, for example, as the inner product between low-dimensional representations. The resulting representations are a very good representation which can be used for various downstream transfer tasks.

As such, the proposed systems and methods are able to leverage label or other class assignment information more effectively than systems that use cross entropy loss. In particular, rather than forcing, as is done in cross entropy loss, the representations for each class to cohere to a specific axis-aligned class value, the use of a contrastive learning approach allows the representations for each class to be learned at any point within the embedding space, allowing more robust inter-class representations to be learned.

Example models trained according to the proposed techniques consistently outperform cross entropy on supervised learning tasks across different architectures and data augmentations. Specifically, as demonstrated by example experimental results contained in U.S. Provisional Patent Application No. 63/013,153, on both ResNet-50 and ResNet-200, example models trained according to the proposed techniques outperform cross entropy by over 1%, setting a new state of the art number of 78:8% among methods that use AutoAugment data augmentation.

The proposed loss also shows clear benefits for robustness to natural corruptions on standard benchmarks on both calibration and accuracy. Further, compared to cross entropy, the proposed supervised contrastive loss is more stable to hyperparameter settings such as optimizers or data augmentations. Additional aspects of the present disclosure leverage key ingredients such as large batch sizes and normalized representations, which have been shown to benefit self-supervised learning.

More particularly, example aspects of the present disclosure are directed to a new loss for supervised training which completely does away with a reference distribution; instead, example implementations of the proposed systems simply impose that normalized representations from the same class are closer together than representations from different classes. The proposed loss builds upon the family of contrastive objective functions, which have achieved excellent performance in self-supervised learning in recent years in the image and video domains and have connections to the large literature on metric learning.

As the name suggests, contrastive losses consist of two "opposing forces": for a given anchor point, the first force pulls the anchor closer in representation space to other points, and the second force pushes the anchor farther away from other points. The former set is known as positives, and the latter as negatives.

One aspect of the present disclosure is to consider many positives per anchor in addition to many negatives (e.g., as opposed to the convention in self-supervised contrastive learning which uses only a single positive). In some implementations, provided labels or other class-based designations can be used to select the positives and negatives. FIGS. 1A-B and 2A-C provide a visual explanation of the proposed loss.

Specifically, FIGS. 1A and 1B illustrate differences between supervised vs. self-supervised contrastive losses. In example implementations of the supervised contrastive loss proposed herein (shown generally at FIG. 1A), positives from one class are contrasted with negatives from other classes (since labels are provided); This results in images from the same class (but not necessarily depicting the same exact scene or subject) being mapped to nearby points in a low-dimensional hypersphere. In contrast, in self-supervised contrastive loss (shown generally at FIG. 1B), labels are not provided. Hence positives are generated as data augmentations of a given sample (crops, flips, color changes etc.), and negatives are randomly sampled from the mini-batch. This can result in false negatives (shown in bottom right), which may not be mapped correctly, resulting in a worse representation.

FIGS. 2A-C illustrate differences between cross entropy, self-supervised contrastive loss, and supervised contrastive loss. In particular, the cross entropy loss (shown generally at FIG. 2A) uses labels and a softmax loss to train a model while the self-supervised contrastive loss (shown generally at FIG. 2B) uses a contrastive loss and data augmentations to learn representations about classes. However, in some implementations, the proposed supervised contrastive loss (shown generally at FIG. 2C) has two stages; in the first stage labels are used to choose the images for a contrastive loss, including multiple positive examples and one or more negative examples. In the second stage, the learned representations are frozen and then a classifier or other task-specific head can be learned (e.g., on a linear layer) using a softmax or cross entropy loss. This two stage approach combines all the benefits of using labels and contrastive losses and softmax or cross entropy loss as well.

The resulting loss is stable to train, as shown by example empirical results contained in the U.S. Provisional Patent Application No. 63/013,153. As one example, example models trained according to the proposed supervised contrastive techniques achieves very good top-1 accuracy on the ImageNet dataset on the ResNet-50 and ResNet-200 architectures. On ResNet-50 with Auto-Augment, example implementations achieve a top-1 accuracy of 78.8%, which is a 1.6% improvement over the cross-entropy loss with the same data augmentation and architectureits. The gain in top-1 accuracy is also accompanied by increased robustness as measured on the ImageNet-C dataset.

The systems and methods of the present disclosure offer a number of technical effects and benefits. As one example technical effect, the proposed loss allows models to learn state of the art representations compared to cross-entropy, giving significant boosts in top-1 accuracy and robustness. Thus, the proposed techniques improve the performance and functionality of the computing system itself at various tasks such as image classification tasks.

As another example technical effect, the proposed loss is less sensitive to a range of hyperparameters than cross-entropy, which is an important practical consideration. This reduced sensitivity is due to the more natural formulation of the loss that pulls representations of samples from the same class to be pulled closer together, rather than forcing them to be pulled towards a specific target as done in cross-entropy. In typical training systems, many rounds of training may need to be performed to "tune" the hyperparameters to find an acceptable or optimal performance. By reducing the sensitivity of the loss and model to hyperparameters, fewer training rounds may need to be performed to tune the hyperparameters. Reducing the number of training rounds performed results in savings of computing resources such as processor usage, memory usage, network bandwidth, etc.

As yet another example technical effect, as shown analytically herein, the gradient of the proposed loss function encourages learning from hard positives and hard negatives. In certain existing systems, explicit and computationally expensive approaches to identifying particular hard negatives are typically performed. One example approach of this nature is "hard negative mining." These approaches improve performance but require expenditure of significant computational resources. By naturally encouraging learning from hard positives and hard negatives, such explicit attempts to identify hard examples (e.g., hard negatives) can be obviated, resulting in savings of computing resources such as processor usage, memory usage, network bandwidth, etc.

As yet another example technical effect, the proposed approach can result in reducing the number of false negatives that a trained model produces. For example, by enabling learning over positive examples that are within the same class, but depict different subjects or scenes, such positive examples can avoid being treated as negative examples. As such, the trained model learns to provide consistent representations for all class members, rather than only for specific subjects or scenes. Trained models with reduced false negatives represents an improvement in the functioning of the computing system itself.

Thus, aspects of the present disclosure provide an improved contrastive learning loss that outperforms cross entropy on classification accuracy and robustness benchmarks. Furthermore, example experiments show that this loss is less sensitive to hyperparameter changes, which could be a useful practical consideration. The loss function provides a natural connection between fully unsupervised training on the one end, and fully supervised training on the other. This opens the possibility of applications in semi-supervised learning which can leverage the benefits of a single loss that can smoothly shift behavior based on the availability of labeled data.

Example Systems and Methods for Supervised Contrastive Learning

This section begins by reviewing the contrastive learning loss for self-supervised representation learning. Next, it is shown how this loss can be modified to be suitable for fully supervised learning, while simultaneously preserving properties important to the self-supervised approach.

Example Representation Learning Framework

Figure 3:
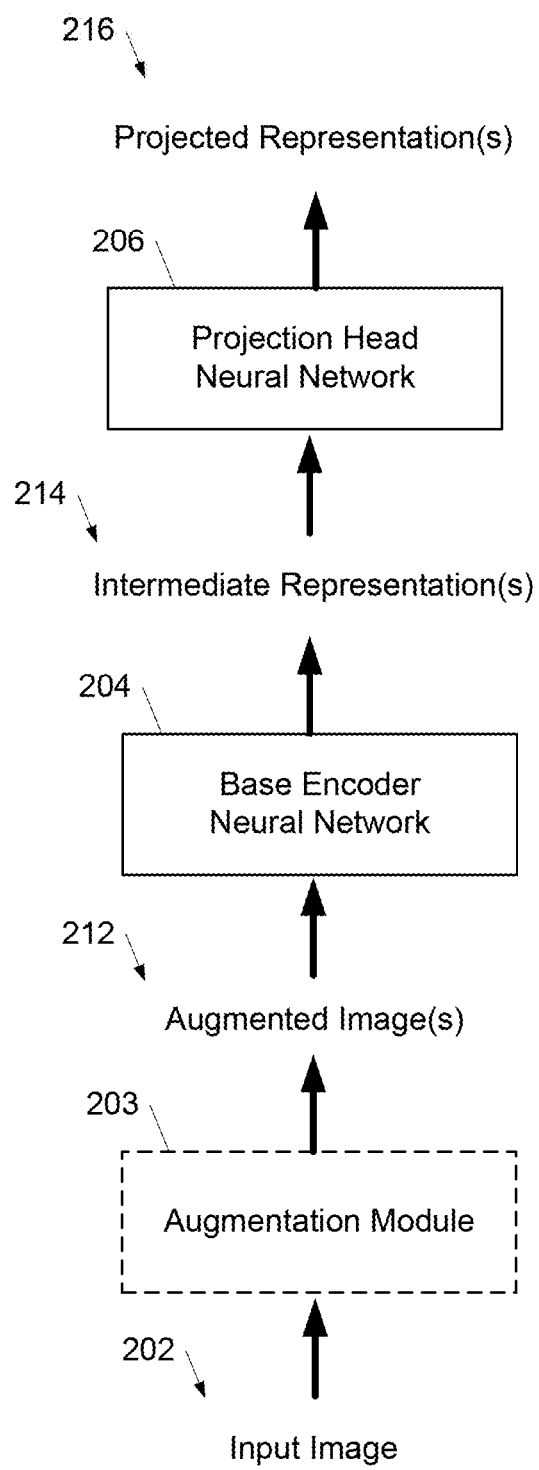
FIG. 3 shows an example contrastive learning framework according to example embodiments of the present disclosure.

One example representation learning framework is shown in FIG. 3 and is structurally similar to that typically used for self-supervised contrastive learning. As illustrated in FIG. 3, one example representation learning framework consists of the following components. (Also see FIGS. 1A-B and 2A-C for an illustration of the difference between the supervised and self-supervised scenarios).

An optional data augmentation module 203, $A(\cdot)$, which transforms an input image 202, x, into a randomly augmented image 212, $\tilde{x}$. In some implementations, for each input image 202, the system can be implemented to generate two or more randomly augmented images 212, each of which represents a different view of the data and thus contains some subset of the information in the original input image. However, other implementations can be configured to generate only a single augmented image. Example expressions (e.g., example loss functions) contained herein which make reference to two times a number of images included in a class are stylized in such way to account for an example embodiment which generates two augmented images per input image. However, such stylization can be modified to account for a different number of augmented images generated per input image.

Referring to the data augmentation module 203, as one example, a first stage of augmentation can include applying a random crop to the image and then resizing that back to the image's native resolution. As another example, in light of findings that self-supervised contrastive loss requires significantly different data augmentation than cross-entropy loss, a second stage can include some or all of the different augmentations described in any of the following:

AutoAugment: Ekin D Cubuk, Barret Zoph, Dandelion Mane, Vijay Vasudevan, and Quoc V Le. Autoaugment: Learning augmentation strategies from data. In *Proceedings of the IEEE conference on computer vision and pattern recognition*, pages 113-123, 2019.

RandAugment: Ekin D Cubuk, Barret Zoph, Jonathon Shlens, and Quoc V Le. Randaugment: Practical data augmentation with no separate search. *arXiv preprint* arXiv:1909.13719, 2019

SimAugment: A variant of the strategy of Ting Chen, Simon Kornblith, Mohammad Norouzi, and Geoffrey Hinton. A simple framework for contrastive learning of visual representations. *arXiv preprint* arXiv:2002.05709, 2020 to sequentially apply random color distortion and Gaussian blurring, where an additional sparse image warp is probabilistically added to the end of the sequence.

More generally, the data augmentation module 203 can perform any different combination of one or more augmentations. Further, some example implementations of the present disclosure do not perform augmentation of the input image 202 and instead simply use the input image 202 without augmentation.

Referring again to FIG. 3, the framework can include a base encoder neural network 204, $E(\cdot)$, which maps an augmented image 212 $\tilde{x}$ to an embedding representation vector 214, $r=E(\tilde{x})\in \mathcal{R}^{D_E}$.

In some example implementations of the framework which generate two augmented images per input image, both of the augmented images for each input image can be separately input to the same encoder, resulting in a pair of representation vectors. More generally, the same encoder network 204 is typically used to generate the representations for all of the images in a training batch.

Two commonly used encoder architectures for the encoder network 204 include the ResNet-50 and ResNet-200, where, for example, the activations of the final pooling layer ($D_E$=2048) can be used as the representation vector 214. In some example implementations, this representation layer can be normalized to the unit hypersphere in $\mathcal{R}^{D_E}$. This normalization can improve performance, consistent with other papers that have used metric losses. The new supervised loss is able to train both of these architectures to a high accuracy with no special hyperparameter tuning. In fact, example experimental results demonstrate that the supervised contrastive loss is less sensitive to small changes in hyperparameters, such as choice of optimizer or data augmentation.

The framework can also include a projection network 206, P(•), which maps the normalized representation vector r 214 into a projected representation 216 $z=P(r) \in \mathcal{R}^{D_P}$ suitable for computation of the contrastive loss. One example projection network 216 can be a multi-layer perceptron with a single hidden layer of size 2048 and output vector of size $D_P=128$. In some example implementations, this vector can again be normalized to lie on the unit hypersphere, which enables using an inner product to measure distances in the projection space. Normalization adds mathematical structure to the form of the gradient which causes improved training in general over the case where normalization is not performed.

A loss function for the input image 202 can be evaluated on the basis of the projected representation 216 (e.g., via comparison to other projected representations generated for other input images such as other positive and negative training examples).

In some implementations, the projection network 206 is only used for training the supervised contrastive loss. After the training is completed, this network can be discarded and replaced with a task-specific head (e.g., a single linear layer). Embedding representations 214 from the encoder 204 give improved performance on downstream tasks than the projected representations 216 from the projection network 206. Thus, in some implementations, the proposed inference-time models can contain exactly the same number of parameters as their cross-entropy equivalents.

Figure 4:
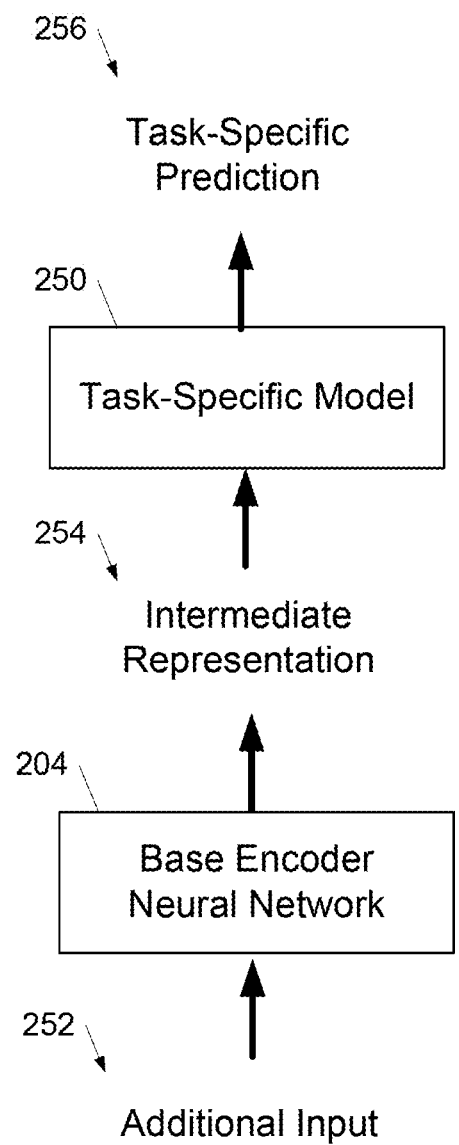
FIG. 4 shows an example fine-tuned model that features a base encoder learned according to an example contrastive learning framework according to example embodiments of the present disclosure.

As one example, FIG. 4 depicts a graphical diagram of an example use of a base encoder neural network 204 after it has been trained in the example framework shown in FIG. 3. In particular, the base encoder neural network 204 has been extracted and an additional task specific model 250 has been appended to the base encoder neural network 204. For example, the task specific model 250 can be any kind of model including linear models or non-linear models such as neural networks.

The task specific model 250 and/or the base encoder neural network 204 can be additionally trained (e.g., "fine-tuned") on additional training data (e.g., which may be task specific data). The additional training can be, for example, supervised learning training.

After fine-tuning, an additional input 252 can be provided to the base encoder neural network 204 which can produce an embedding representation 254. The task-specific model 250 can receive and process the embedding representation 254 to generate a task-specific prediction 256. As examples, the task-specific prediction 256 can be a classification prediction; a detection prediction; a recognition prediction; a regression prediction; a segmentation prediction; and/or other prediction tasks.

Furthermore, in some implementations, the embedding representation 254 can be directly used for tasks such as similarity search or retrieval without the need for further training/fine-tuning (e.g., without the need for an additional task-specific model 250.

Although the present disclosure focuses on data examples from the image domain for ease of explanation, the framework is extensible to data examples of different domains, including text and/or audio domains. Example types of images that can be used include video frames, LiDAR point clouds, computed tomography scans, X-ray images, hyperspectral images, and/or various other forms of imagery.

Example Contrastive Losses: Self-Supervised and Supervised

Example implementations of the present disclosure provide a contrastive loss function that allows for an impactful incorporation of labeled data while at the same time preserves the beneficial properties of contrastive losses which have been paramount to the success of self-supervised representation learning. Similar to self-supervised contrastive learning, example implementations of the present disclosure can generate minibatches by randomly sampling the data. As one example, for a set of N randomly sampled image/label pairs, $\{x_k, y_k\}_{k=1 \ldots N}$, the corresponding minibatch used for training can include of 2N pairs, $\{\tilde{x}_k, \tilde{y}_k\}_{k=1 \ldots 2N}$, where, $\tilde{x}_{2k}$ and $\tilde{x}_{2k-1}$ are two random augmentations of $x_k$ (k=1 ... N) and $\tilde{y}_{2k-1}=\tilde{y}_{2k}=y_k$. Again, some other number of augmented images can be generated for each input image; two is provided as an example.

Example Self-Supervised Contrastive Loss

Within a minibatch, let $i \in \{1 \ldots 2N\}$ be the index of an arbitrary augmented image, and let j(i) be the index of the other augmented image originating from the same source image. In self-supervised contrastive learning, the loss takes the following form.

$$\mathcal{L}^{self} = \sum_{i=1}^{2N} \mathcal{L}_i^{self} \quad (1)$$

$$\mathcal{L}_i^{self} = -\log \frac{\exp\left(\frac{z_i \cdot z_{j(i)}}{\tau}\right)}{\sum_{k=1}^{2N} 1_{i \neq k} \cdot \exp\left(\frac{z_i \cdot z_k}{\tau}\right)} \quad (2)$$

where $z_\ell = P(E(\tilde{x}_\ell))$, $1_B \in \{0,1\}$ is an indicator function that returns 1 iff B evaluates as true, and $\tau \in \mathcal{R}^+$ is a temperature parameter. Within the context of Eq. 2, index i is called the anchor, index j is called the positive, and the other 2(N−1) indices (k=1 ... 2N, k∉{i,j}) are called the negatives. $z_i \cdot z_{j(i)}$ is one example similarity metric which computes an inner (dot) product between the normalized vectors $z_i$ and $z_{j(i)}$ in 128-dimensional space. Note that for each anchor i, there is 1 positive pair and 2N−2 negative pairs. The denominator has a total of 2N−1 terms (the positive and negatives).

It is insightful to consider the effects on the encoder due to minimizing Eq. 1. During training, for any i, the encoder is tuned to maximize the numerator of the log argument in Eq. 2 while simultaneously minimizing its denominator. The constraint that the term $\exp(z_i \cdot z_{j(i)})$ is present in both the numerator and the denominator ensures that the log argument goes no higher than 1, and since Eq. 1 sums over all pairs of indices ((i, j) and (j, i)), the encoder is restricted from minimizing the denominator or maximizing the numerator without doing the other as well. As a result, the encoder learns to map similar views to neighboring representations while mapping dissimilar ones to non-neighboring ones, but proceeds on the basis of only a single positive example per evaluation.

Example Supervised Contrastive Loss

For supervised learning, the contrastive loss in Eq. 2 is incapable of handling the case where more than one sample is known with certainty to belong to the same class. To generalize the loss to handle arbitrary numbers of positives belonging to the same class, the following novel loss function is proposed:

$$\mathcal{L}^{sup} = \sum_{i=1}^{2N} \mathcal{L}_i^{sup} \qquad (3)$$

$$\mathcal{L}_i^{sup} = \frac{-1}{2N_{\tilde{y}_i} - 1} \sum_{j=1}^{2N} 1_{i \neq j} \cdot 1_{\tilde{y}_i = \tilde{y}_j} \cdot \log \frac{\exp\left(\frac{z_i \cdot z_j}{\tau}\right)}{\sum_{k=1}^{2N} 1_{i \neq k} \cdot \exp\left(\frac{z_i \cdot z_k}{\tau}\right)} \qquad (4)$$

where $N_{\tilde{y}_i}$ is the total number of images in the minibatch that have the same label, $\tilde{y}_i$, as the anchor, i. Again, formulations of 2N are provided to account for the example setting in which two augmented images are generated per training image, but other numbers can be used. The example loss given in equations (3) and (4) has important properties well suited for supervised learning:

Generalization to an arbitrary number of positives. One major structural change of Eq. 4 over Eq. 2 is that now, for any anchor, all positives in a minibatch (i.e., the augmentation-based one as well as any of the remaining 2(N−1) entries that are from the same class) contribute to the numerator. For minibatch sizes that are large with respect to the number of classes, multiple additional terms will be present (on average, $N_{L_i}$=N/C, where C is the number of classes). The loss encourages the encoder to give closely aligned representations to all entries from the same class in each instance of Eq. 4, resulting in a more robust clustering of the representation space than that generated from Eq. 2.

Contrastive power increases with more positives and/or more negatives. The example general form of the self-supervised contrastive loss given in Eq. 4 leverages the principle that the ability to discriminate between signal and noise (negatives) is improved by adding more examples of positives and/or more examples of negatives. This property has been shown to be important to representation learning via self-supervised contrastive learning, with many studies showing increased performance with increasing number of negatives.

The example supervised contrastive loss in Eq. 4 preserves this structure: adding larger numbers of negatives to the denominator provides increased contrast for the positives; likewise adding larger numbers of positives to the numerator provides increased contrast for the negatives. More positives allow the model to better capture intra-class variation. More negatives allow the model to capture inter-class variation.

Discussion of Example Supervised Contrastive Loss Gradient Properties

This subsection now provides further motivation for the form of the example supervised contrastive loss in Eq. 4 by showing that its gradient has a structure that naturally causes learning to focus more on hard positives and negatives (i.e., ones against which continuing to contrast the anchor greatly benefits the encoder) rather than on weak ones (i.e., ones against which continuing to contrast the anchor only weakly benefits the encoder). The loss can thus be seen to be efficient in its training. Other contrastive losses, such as triplet loss, often use the computationally expensive technique of hard negative mining to increase training efficacy. As a byproduct of this analysis, the addition of a normalization layer at the end of the projection network is shown to be beneficial since its presence allows the gradient to have this structure.

If we let w denote the projection network output immediately prior to normalization (i.e., z=w/‖w‖), then the gradients of Eq. 4 with respect to w has the form:

$$\frac{\partial \mathcal{L}_i^{sup}}{\partial w_i} = \frac{\partial \mathcal{L}_i^{sup}}{\partial w_i}\bigg|_{pos} + \frac{\partial \mathcal{L}_i^{sup}}{\partial w_i}\bigg|_{neg} \qquad (5)$$

where:

$$\frac{\partial \mathcal{L}_i^{sup}}{\partial w_i}\bigg|_{pos} \propto \sum_{j=1}^{2N} 1_{i \neq j} \cdot 1_{\tilde{y}_i = \tilde{y}_j} \cdot ((z_i \cdot z_j) \cdot z_i - z_j) \cdot (1 - P_{ij}) \qquad (6)$$

$$\frac{\partial \mathcal{L}_i^{sup}}{\partial w_i}\bigg|_{neg} \propto \sum_{j=1}^{2N} 1_{i \neq j} \cdot 1_{\tilde{y}_i = \tilde{y}_j} \cdot \sum_{k=1}^{2N} 1_{k \notin \{i,j\}} \cdot (z_k - (z_i \cdot z_k) \cdot z_i) \cdot P_{ik} \qquad (7)$$

where:

$$P_{i\ell} = \frac{\exp(z_i \cdot z_\ell / \tau)}{\sum_{k=1}^{2N} 1_{i \neq k} \cdot \exp(z_k \cdot z_\ell / \tau)}, \, i, \ell \in \{1 \ldots 2N\}, \, i \neq \ell \qquad (8)$$

is the $\ell$'th component of the temperature-scaled softmax distribution of inner products of representations with respect to anchor i and is thus interpretable as a probability. Eq. 6 generally includes contributions from the positives in the minibatch, while Eq. 7 includes those for negatives. It is now shown that easy positives and negatives (i.e., ones against which continuing to contrast the anchor only weakly benefits the encoder) have small gradient contributions while hard positives and negatives (i.e., ones against which continuing to contrast the anchor greatly benefits the encoder) have large ones. For an easy positive, $z_i \cdot z_j \approx 1$ and thus $P_{ij}$ is large. Thus (see Eq. 6):

$$\|((z_i \cdot z_j) \cdot z_i - z_j)\| \cdot (1 - P_{ij}) = \sqrt{1 - (z_i \cdot z_j)^2} \cdot (1 - P_{ij}) \approx 0 \qquad (9)$$

However, for a hard positive, $z_i \cdot z_j \approx 0$ and $P_{ij}$ is moderate, so:

$$\|((z_i \cdot z_j) \cdot z_i - z_j)\| \cdot (1 - P_{ij}) = \sqrt{1 - (z_i \cdot z_j)^2} \cdot (1 - P_{ij}) > 0 \qquad (10)$$

Thus, for weak positives, where further contrastive efforts are of diminishing returns, the contribution to $\|\nabla_{z_i} \mathcal{L}_{i,pos}^{sup}\|$ is small, while for hard positives, where further contrastive efforts are still needed, the contribution is large. For a weak negative $(z_i \cdot z_k \approx -1)$ and a hard negative $(z_i \cdot z_k \approx 0)$, analogous calculations of $\|(z_k - (z_i \cdot z_k) \cdot z_i)\| \cdot P_{ik}$ from Eq. 7 give similar conclusions: the gradient contribution is large for hard negatives and small for weak ones. The general $((z_i \cdot \mathbf{z}_\ell) \cdot \mathbf{z}_\ell - \mathbf{z}_\ell)$ structure, which plays a key role in ensuring the gradients are large for hard positives and negatives, appears only if a normalization layer is added to the end of the projection network.

Example Devices and Systems

Figure 5A:
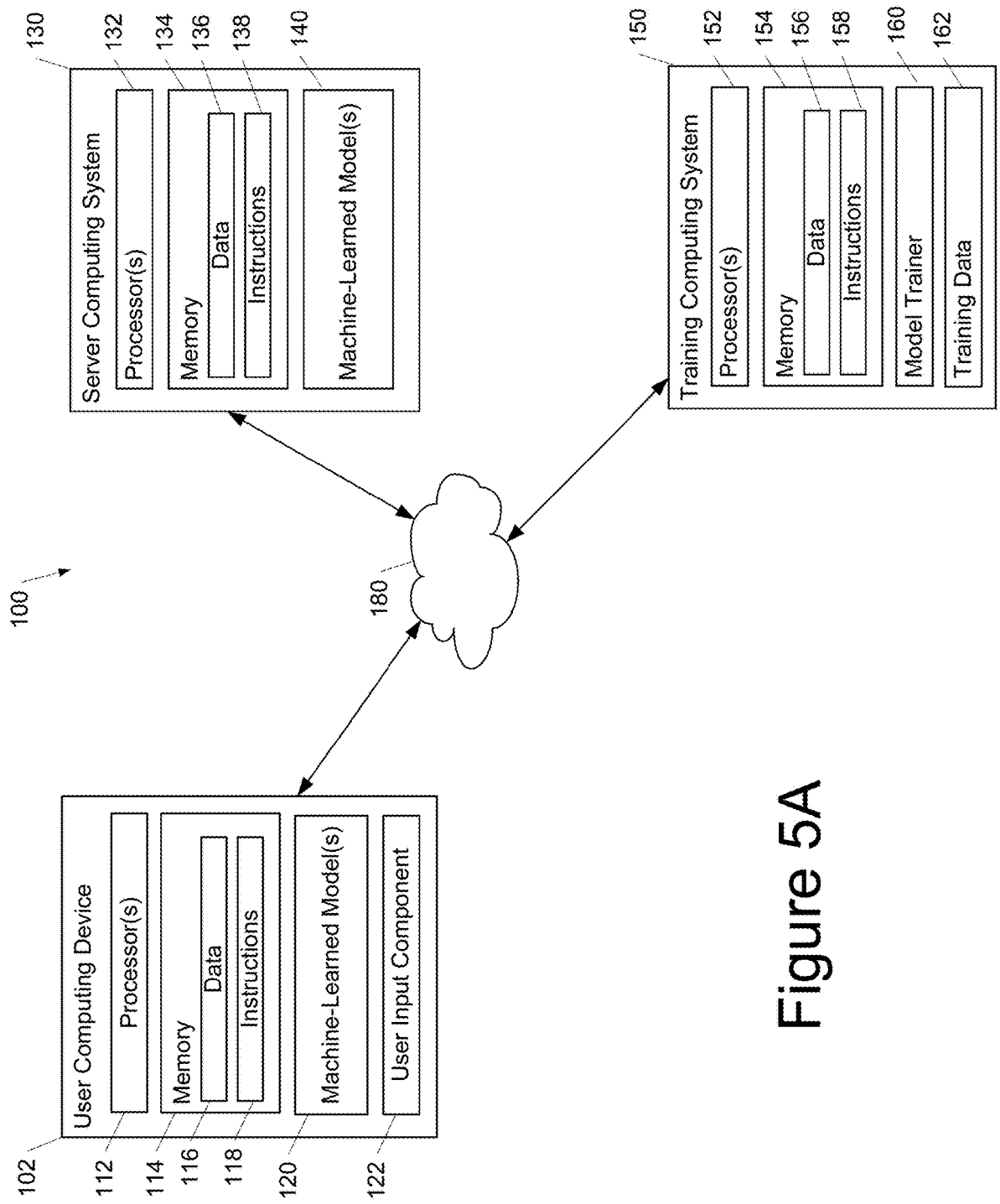
FIG. 5A depicts a block diagram of an example computing system according to example embodiments of the present disclosure.

FIG. 5A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 3 and 4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel predictions across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a prediction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 3 and 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors (e.g., according to the framework shown in FIG. 3. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions such as those described herein at equations 1-4. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data of different modalities such as imagery, audio samples, text, and/or the like. Example types of images that can be used include video frames, LiDAR point clouds, X-ray images, computed tomography scans, hyper-spectral images, and/or various other forms of imagery.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
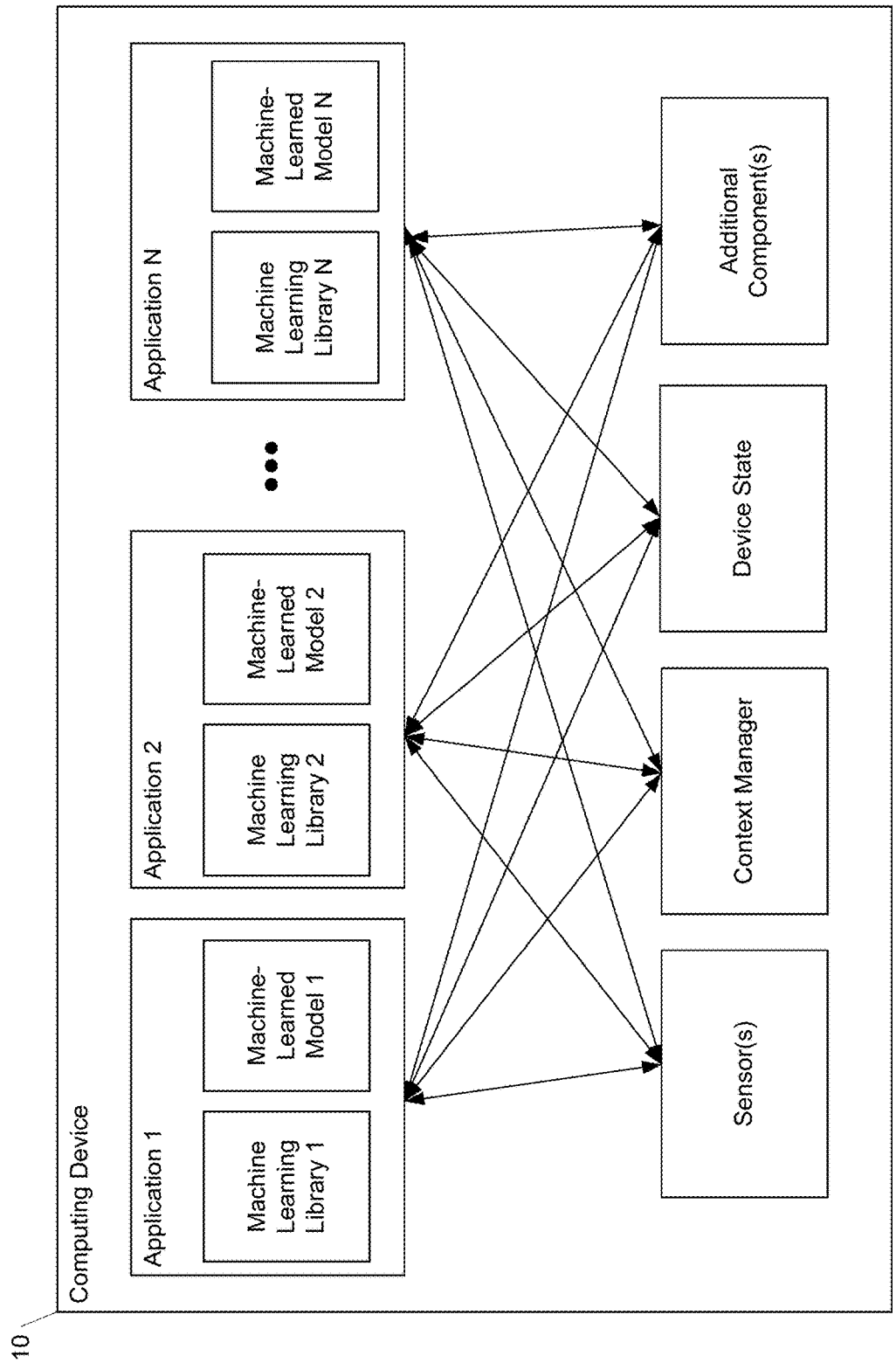
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
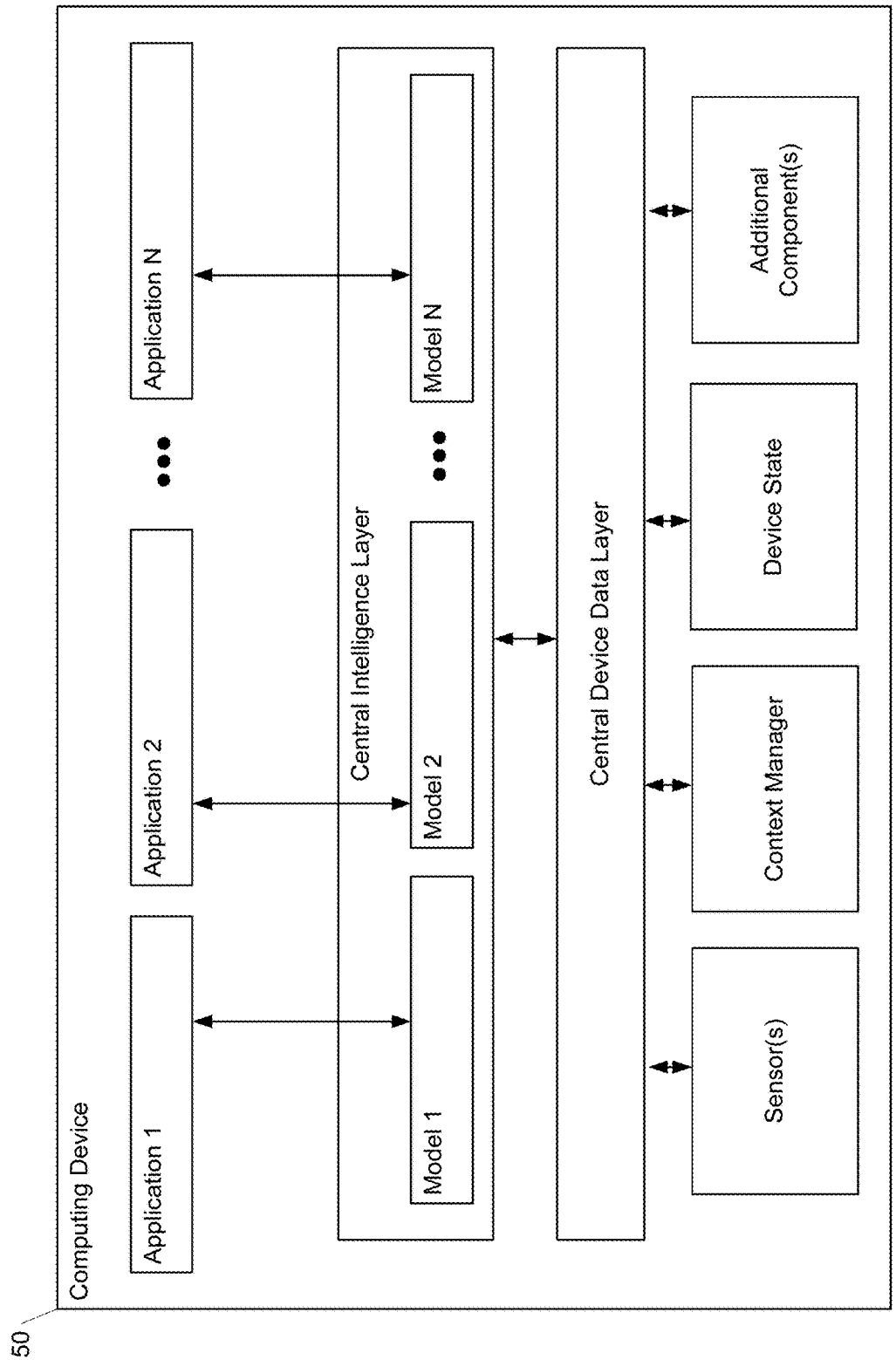
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system to perform supervised contrastive learning of visual representations, the computing system comprising:

one or more processors; and one or more non-transitory computer-readable media that collectively store:
- a base encoder neural network configured to process an input image to generate an embedding representation of the input image;
- a projection head neural network configured to process the embedding representation of the input image to generate a projected representation of the input image; and
- instructions that, when executed by the one or more processors, cause the computing system to perform operations, the operations comprising:
  - obtaining an anchor image associated with a first class of a plurality of classes, a plurality of positive images associated with the first class, and one or more negative images associated with one or more other classes of the plurality of classes, the one or more other classes being different from the first class;
  - processing, with the base encoder neural network, the anchor image to obtain an anchor embedding representation for the anchor image, the plurality of positive images to respectively obtain a plurality of positive embedding representations, and the one or more negative images to respectively obtain one or more negative embedding representations;
  - processing, with the projection head neural network, the anchor embedding representation to obtain an anchor projected representation for the anchor image, the plurality of positive embedding representations to respectively obtain a plurality of positive projected representations, and the one or more negative embedding representations to respectively obtain one or more negative projected representations;
  - evaluating a loss function that evaluates a similarity metric between the anchor projected representation and each of the plurality of positive projected representations and each of the one or more negative projected representations,
    - wherein the loss function comprises a first summation, across all images in the training batch that belong to the same class as the anchor image, of a contrastive loss term, and
    - wherein the contrastive loss term comprises a log of an exponential of the similarity metric between the anchor projected representation and positive projected representation for the image under evaluation by the first summation divided by a second summation, for all other images in the training batch, of an exponential of the similarity metric between the anchor projected representation and the negative projected representations for the image under evaluation by the second summation; and
  - modifying one or more values of one or more parameters of at least the base encoder neural network based at least in part on the loss function.

2. The computing system of claim 1, wherein the anchor image and at least one of the one or more positive images depicts different subjects belonging to the same first class of the plurality of classes.

3. The computing system of claim 1, wherein the plurality of positive images comprise all images contained within a training batch that are associated with the first class, and wherein the one or more negative images comprise all images contained within the training batch that are associated with any of the plurality of classes other than the first class.

4. The computing system of claim 1, wherein the operations further comprise respectively augmenting each of the anchor image, the plurality of positive images, and the one or more negative images prior to processing each of the anchor image, the plurality of positive images, and the one or more negative images with the base encoder neural network.

5. The computing system of claim 1, wherein the projection head neural network comprises a normalization layer that normalizes the projected representation for the input image.

6. The computing system of claim 1, wherein the similarity metric comprises an inner product.

7. The computing system of claim 1, wherein the loss function further comprises a normalization term that comprises negative one divided by two times the number of images included in the first class of the anchor image minus one.

8. The computing system of claim 1, wherein the operations further comprise, after modifying one or more values of one or more parameters of at least the base encoder neural network based at least in part on the loss function:
- adding a classification head to the base encoder neural network; and
- finetuning the classification head based on a set of supervised training data.

9. The computing system of claim 1, wherein the operations further comprise, after modifying one or more values of one or more parameters of at least the base encoder neural network based at least in part on the loss function:
- providing an additional input to the base encoder neural network;
- receiving an additional embedding representation for the additional input as an output of the base encoder neural network; and
- generating a prediction for the additional input based at least in part on the additional embedding representation.

10. The computing system of claim 9, wherein the prediction comprises a classification prediction, a detection prediction, a recognition prediction, a regression prediction, a segmentation prediction, or a similarity search prediction.

11. The computing system of claim 1, wherein the anchor image comprises an x-ray image.

12. The computing system of claim 1, wherein the anchor image comprises a set of LiDAR data.

13. The computing system of claim 1, wherein the anchor image comprises a video.

14. A computer-implemented method, the method comprising:
- obtaining an anchor image associated with a first class of a plurality of classes, a plurality of positive images associated with the first class, and one or more negative images associated with one or more other classes of the plurality of classes, the one or more other classes being different from the first class;
- processing, with a base encoder neural network, the anchor image to obtain an anchor embedding representation for the anchor image, the plurality of positive images to respectively obtain a plurality of positive embedding representations, and the one or more negative images to respectively obtain one or more negative embedding representations;

processing, with a projection head neural network, the anchor embedding representation to obtain an anchor projected representation for the anchor image, the plurality of positive embedding representations to respectively obtain a plurality of positive projected representations, and the one or more negative embedding representations to respectively obtain one or more negative projected representations;

evaluating a loss function that evaluates a similarity metric between the anchor projected representation and each of the plurality of positive projected representations and each of the one or more negative projected representations, wherein the loss function comprises a first summation, across all images in the training batch that belong to the same class as the anchor image, of a contrastive loss term, and wherein the contrastive loss term comprises a log of an exponential of the similarity metric between the anchor projected representation and positive projected representation for the image under evaluation by the first summation divided by a second summation, for all other images in the training batch, of an exponential of the similarity metric between the anchor projected representation and the negative projected representations for the image under evaluation by the second summation; and modifying one or more values of one or more parameters of at least the base encoder neural network based at least in part on the loss function.

15. The computer-implemented method of claim 14, wherein the anchor image and at least one of the one or more positive images depicts different subjects belonging to the same first class of the plurality of classes.

16. The computer-implemented method of claim 14, wherein the plurality of positive images comprise all images contained within a training batch that are associated with the first class, and wherein the one or more negative images comprise all images contained within the training batch that are associated with any of the plurality of classes other than the first class.

17. The computer-implemented method of claim 14, further comprising:
respectively augmenting each of the anchor image, the plurality of positive images, and the one or more negative images prior to processing each of the anchor image, the plurality of positive images, and the one or more negative images with the base encoder neural network.

18. One or more non-transitory computer-readable media that collectively store at least a base encoder neural network that has been trained by performance of operations, the operations comprising:

obtaining an anchor image associated with a first class of a plurality of classes, a plurality of positive images associated with the first class, and one or more negative images associated with one or more other classes of the plurality of classes, the one or more other classes being different from the first class;

processing, with the base encoder neural network, the anchor image to obtain an anchor embedding representation for the anchor image, the plurality of positive images to respectively obtain a plurality of positive embedding representations, and the one or more negative images to respectively obtain one or more negative embedding representations;

processing, with a projection head neural network, the anchor embedding representation to obtain an anchor projected representation for the anchor image, the plurality of positive embedding representations to respectively obtain a plurality of positive projected representations, and the one or more negative embedding representations to respectively obtain one or more negative projected representations;

evaluating a loss function that evaluates a similarity metric between the anchor projected representation and each of the plurality of positive projected representations and each of the one or more negative projected representations, wherein the loss function comprises a first summation, across all images in the training batch that belong to the same class as the anchor image, of a contrastive loss term, and wherein the contrastive loss term comprises a log of an exponential of the similarity metric between the anchor projected representation and positive projected representation for the image under evaluation by the first summation divided by a second summation, for all other images in the training batch, of an exponential of the similarity metric between the anchor projected representation and the negative projected representations for the image under evaluation by the second summation; and modifying one or more values of one or more parameters of at least the base encoder neural network based at least in part on the loss function.

* * * * *